3,351,397
THRUST BEARING ASSEMBLY FOR
ROTATABLE SHAFT
Wilbur Shapiro, Bethayres, Pa., and Carrol J. Hoffman, Westwood, Mass., assignors, by mesne assignments, to the United States of America as represented by the Secretary of the Navy
Filed Nov. 29, 1965, Ser. No. 510,470
7 Claims. (Cl. 308—160)

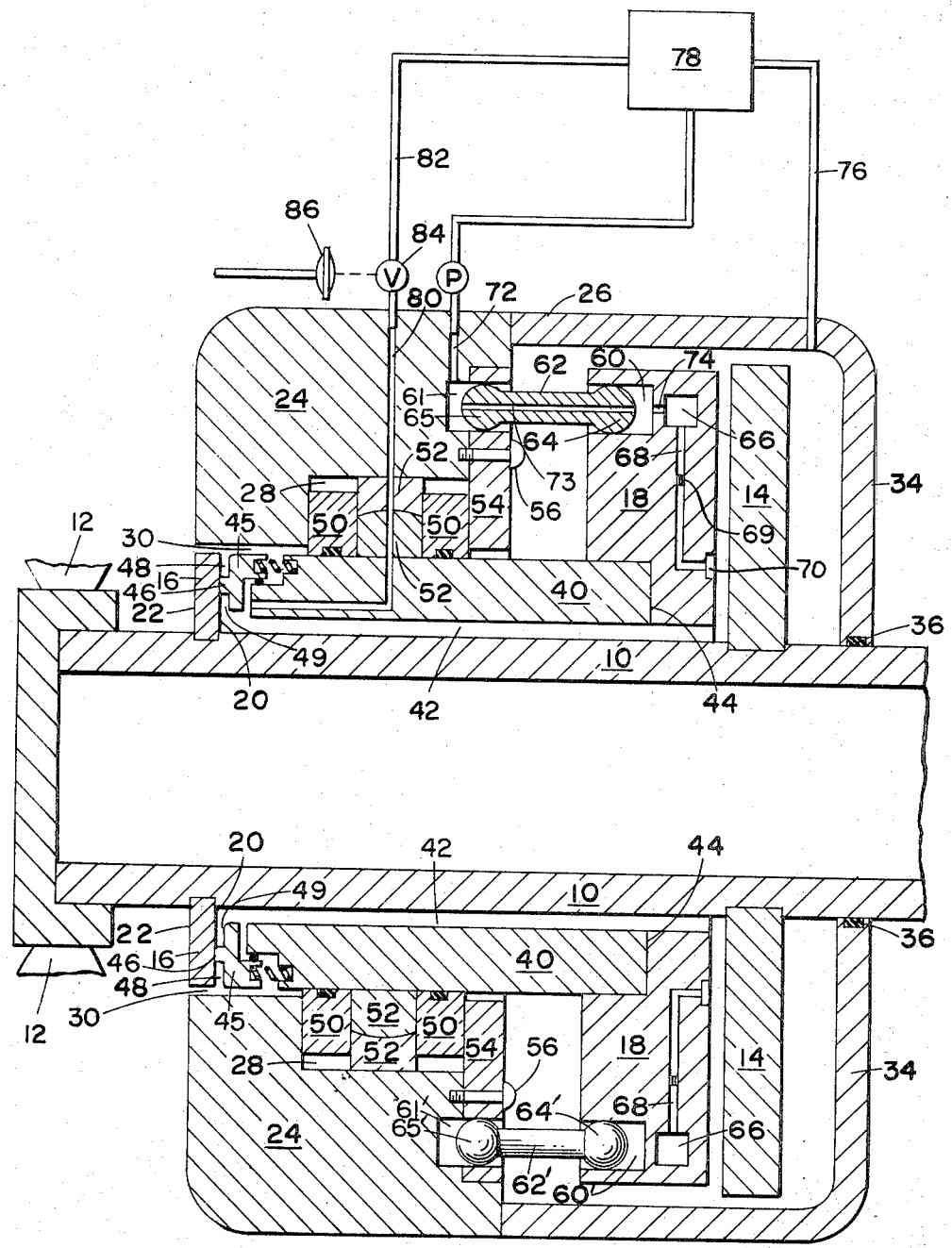

This invention relates to shaft seals and is particularly concerned with seal structure for use with propeller shafts of submarines which are operated at substantial depths and high water pressures.

An object of this invention is to provide sealing structure for rotating shafts which is operative to maintain an effective seal across a sealing surface regradless of the absolute pressure level of the fluid being sealed.

Another object of this invention is to combine such sealing structure with a propeller shaft in a manner to permit substantial axial, radial and angular movements of the shaft.

Another object of this invention is directed to such sealing structure for a submarine propeller which provides an effective seal at low differential pressure between a sealing fluid and sea water regardless of the absolute pressure levels involved.

Other objects, advantages and novel features of the invention will become apparent from the following detailed description of the invention when considered in conjunction with the accompanying drawings, wherein.

The single figure of the drawing is a longitudinal section of the sealing structure applied to a propeller shaft and showing diagrammatically a circulating system for a sealing fluid.

In the drawing a propeller shaft is indicated at 10 and mounts for rotation therewith a propeller device 12 which is disposed adjacent one end thereof and during operation exerts an axial thrust. The shaft 10 also mounts for rotation an annular front plate 14 and spaced rearwardly thereof a second annular plate 16. The plate 14 provides a thrust collar for a hydrostatic thrust bearing device 18 while the plate 16 forms a seal element which coacts with an assembly to form a face seal as will be described later. The seal element 16 provides an inner pressure area 20 and also an outer pressure area 22.

A housing is fixedly mounted relative to the shaft 10 and comprises a rear cylindrical block section 24 and a front hollow section 26. The rear section 24 is formed with a relatively large diameter inner axial counterbore 28 and a relatively small diameter communicating outer axial bore 30 which space the section 24 radially from the shaft 10 and also communicate with the front section 26. The front section 26 has an end closure 34 which is provided with a seal 36 to prevent fluid leakage along the shaft 10. The various structural elements forming the seal, including the thrust collar 14 and thrust bearing 18, are disposed within the housing sections and are relatively arranged to permit the thrust bearing 18 to move relative to the thrust collar 14 in accordance with variations in the sea water pressure and to move with the thrust collar in accordance with movements of the shaft 10.

A sleeve 40 surrounds the shaft 10 and is positioned between the seal plate 16 and the thrust bearing 18. This sleeve forms with the shaft an annulus 42 for sealing fluid and extends into the bore 30 in spaced relation with the housing section 24 permitting sea water to enter the space 30. The inner end of the sleeve is secured to the thrust bearing 18 in a counterbore 44 and the outer end of the sleeve is designed to coact with the face plate 16 to provide the face seal. For this purpose, the outer end of the sleeve 40 mounts an axially movable seal ring 45 by spring biasing means as shown and is urged in constant contact with the seal plate 16 by the biasing means and also by water pressure from bore 30 and by sealing fluid pressure from annulus 42 on the front face of the seal ring. Also, as shown, these liquids are separated by means of an O ring disposed in the space between the sleeve 40 and the inner face of the seal ring 45. The outer face of the seal ring is provided with an annular rib 46 which forms an outer annular water space 48 and an inner annular sealing fluid space 49 as indicated. The above described seal ring structure permits the sea water pressure on the seal element to be overcome and sealed by the maintenance of the sealing fluid in annulus 42 at a pressure only slightly above the sea water pressure. Thus, the differential pressure across the annular rib 46 of the seal ring 45 may be maintained at a relatively small value in order to provide an effective seal.

Similar sealing rings 50—50 are provided as shown and self aligning bearings 52—52 are disposed therebetween to provide an assembly which seals sea water from entering counterbore 28 and also permits axial and angular movement of the sleeve 40 under corresponding movements of the shaft 10. These respective elements are maintained within the space 28 by a keeper ring 54 which may be removably secured to the rear housing section 24 by bolt means 56 as shown.

The thrust bearing 18 and other elements assembled therewith are permitted freedom of movement by a socket 60 formed with bearing 18 and a similar socket 61 formed in the housing section 24 and keeper plate 54 which receive a coupling 62 having opposed similar spherical ends 64 and 65. As shown the sockets 60, 61 and spherical ends 64, 65 provide universal connections which permit these elements to move axially, radially and angularly with respect to the shaft 10. One or more similar universal connections as represented by $60^1$, $61^1$ and $62^1$, $64^1$ and $65^1$ may be used if desired. For a purpose to be described, the thrust bearing is also formed with a ring manifold 66 having radial passageways 68 with a restrictor 69 therein and communicating with recesses or pockets 70, spaced circumferentially of the front face of the bearing.

A circulating system for a suitable sealing fluid is provided by a pump P located in inlet passageway 72 partly formed in the rear housing section 24, socket 61, a passageway 73 formed in coupling 62, socket 60 and a branch passageway 74 in communication between the cavity 60 and manifold 66. The sealing liquid is distributed by the manifold 66 through radial passageways 68, restrictors 69, pockets 70 for applying pressure on thrust collar 14 which will vary according to the spacing or clearance between the thrust bearing 18 and thrust collar 14. A portion of the liquid travels outwardly to the front housing section 26 and a portion travels inwardly to the annulus 42. The fluid in the housing section 26 is removed by line 76 and sent to a reservoir 78 while the fluid in annulus 42 is operative to effect the seal and exits by outlet passageway 80 formed in the sleeve 40 bearings 52—52 and rear housing section 24 and to the reservoir 78 by line 82. The pressure of the sealing liquid in the system is controlled by means of a valve 84, in the outlet line 82, which has a pressure controller 86 biased by sea water pressure to maintain the oil passing through the valve 84 at a low differential of approximately 50 p.s.i., greater than the sea water pressure.

Obviously many modifications and variations of the present invention are possible in the light of the above teachings. It is therefore to be understood that, within

We claim:

1. A thrust bearing assembly for a rotatable shaft which is operative in a body of water under high pressure conditions and subjected to axial thrust comprising,
   (a) fixed cylindrical housing structure having front and rear end walls and a shaft extending axially through the end walls,
   (b) said housing structure providing a rear axial bore open to the body of water and a front space of relatively greater diameter sealed from the body of water,
   (c) a front rotatable transverse disk fixed to the shaft and positioned in the front space and a rear rotatable transverse disk fixed to the shaft and positioned in the rear bore,
   (d) a nonrotatable transverse disk having an axial bore and positioned about said shaft with its front face adjacent the rear face of said front rotatable disk providing a vertical thrust bearing zone therebetween,
   (e) a sleeve about said shaft having its front end secured to the nonrotatable disk and its rear end positioned adjacent said rear rotatable disk,
   (f) said rear end of the sleeve providing a seal ring and said sleeve mounting resilient means to maintain the seal ring in abutting relation with the front face of said rear rotatable disk,
   (g) coupling means having a first universal connection with said rear end wall of the housing and a second universal connection with said nonrotatable disk,
   (h) said coupling means supporting the nonrotatable disk and sleeve to provide an axial annulus with said shaft in communication with the thrust bearing zone and permitting relative axial, radial and angular movements between the shaft and the sleeve and nonrotatable disk assembly,
   (i) means in the rear axial bore providing a longitudinal space between the sleeve and housing and other means to prevent entry of water to the housing,
   (j) a sealing fluid circulating system including a reservoir, an inlet passageway for supplying sealing liquid to the vertical thrust bearing zone and an outlet passageway between the axial annulus and reservoir for removing sealing liquid and
   (k) valve means in the outlet passageway having means to maintain the pressure of liquid in the system at a greater value than the pressure of the body of water whereby entry of water between the seal ring and rear disk is prevented.

2. A thrust bearing assembly as in claim 1, further characterized by spring means securing said seal ring and the rear end of the sleeve together for maintaining the seal ring in abutting relation with the front face of the rear rotatable disk.

3. A thrust bearing assembly as in claim 2, further characterized by said seal ring having an annular rib which is maintained to abutting relation with the front face of the rear rotatable disk.

4. A thrust bearing assembly as in claim 1, further characterized by the coupling means comprising a longitudinal shaft having spherical ends and the first and second universal joints comprising a first socket in the housing receiving one of said spherical ends and a second socket in the nonrotatable disk receiving the other of said spherical ends.

5. A thrust bearing assembly as in claim 1, further characterized by self aligning bearings in the rear axial bore providing a longitudinal space between the sleeve and housing and sealing rings in said axial bore to prevent entry of water from said longitudinal space to the housing.

6. A thrust bearing assembly as in claim 1, further characterized by the inlet passageway of the sealing fluid circulating system including a ring distributing manifold in the nonrotatable disk adjacent its outer periphery and a group of radial passageways in communication therewith each having a restrictor therein and terminating in a recess in the front face of said disk and other passageway means for supplying the sealing fluid through the housing to said distributing manifold.

7. A thrust bearing assembly as in claim 6, further characterized by said other passageway means including a first cavity in the housing, a second cavity in the nonrotatable bearing, a coupling shaft having an axial passageway therein and its ends located in said cavities, a communicating passageway between the reservoir and the first cavity and a communicating passageway in the nonrotatable disk between the second cavity and the manifold.

References Cited

UNITED STATES PATENTS 2,862,733  2/1958  Reiersen _____ 308—36.3
3,194,173  7/1965  Thoma _____ 308—160

MARTIN P. SCHWADRON, *Primary Examiner.*

F. SUSKO, *Examiner.*